US005381900A

United States Patent [19]

Marra

[11] Patent Number: 5,381,900

[45] Date of Patent: Jan. 17, 1995

[54] PRESSURIZED AIR-BOTTLE STAGING MAT

[76] Inventor: Robert T. Marra, 38 Riverdale Ave., Monmouth Beach, N.J. 07750

[21] Appl. No.: 141,517

[22] Filed: Oct. 27, 1993

[51] Int. Cl.[6] ........................ B65D 85/20; E04B 1/00; A62C 13/76; B32B 7/00

[52] U.S. Cl. ........................ 206/446; 52/105; 169/67; 169/50; 206/443; 206/459.5; 428/99; 428/120; 428/137; 428/195

[58] Field of Search ..................... 206/446, 0.6, 459.5, 206/443; 169/49, 50, 67, 66; 428/99, 137, 120, 195; 52/105

[56] References Cited

U.S. PATENT DOCUMENTS

| | | | |
|---|---|---|---|
| 1,871,571 | 8/1932 | Weber | 428/99 X |
| 2,720,269 | 10/1955 | Diacos | 169/50 |
| 3,804,238 | 4/1974 | Howard | 206/459.5 |
| 4,195,059 | 3/1980 | Whitcher et al. | 206/459.5 |
| 4,590,714 | 5/1986 | Walker | 52/105 X |
| 4,682,691 | 7/1987 | Spiering | 206/373 |
| 4,956,218 | 9/1990 | Haining | 169/50 X |
| 5,083,617 | 1/1992 | Pierce, Jr. | 169/50 |

*Primary Examiner*—Bryon P. Gehman
*Attorney, Agent, or Firm*—Charles I. Brodsky

[57] ABSTRACT

A water resistant, durable and foldable staging mat for organizing pressurized air-pak bottles for emergency firematic use incorporating rows of horizontally spaced-apart offset dividers extending above the mat surface in separating bottles as "filled" and "emptied", and with the mat being colored-coded and imprinted for ease in segregating the bottles in use.

15 Claims, 1 Drawing Sheet

PRESSURIZED AIR-BOTTLE STAGING MAT

FIELD OF THE INVENTION

This invention relates to emergency firematic use and, more particularly, to apparatus for organizing pressurized air-pak bottles at a fire scene.

BACKGROUND OF THE INVENTION

As is well known and understood, it is not unusual to find several crews of firemen from different fire companies at an emergency scene. As is equally well known, it is not unusual, either, to find several crews utilizing different rigs of the same Fire Company at the emergency. Even though someone is charged with the responsibility of separating "filled" and "emptied" pressurized air-pak bottles at the scene, experience has shown that "empties" do get mixed-in with "fresh" bottles, and the emergency firemen oftentimes have to search for pressurized bottles to be used as replacements. Typically used procedures of dumping empties near a designated tree, and retrieving "fresh" bottles at the truck simply do not do the job of keeping them segregated.

SUMMARY OF THE INVENTION

As will become clear from the following description, the staging mat of the present invention serves to organize the pressurized air-pak bottles for emergency use by providing a water resistant, foldable rubber or vinyl-coated tarpaulin mat divided in upper and lower sections, color-coded as "GREEN" and imprinted "FULL" and/or "READY FOR USE" and "RED" imprinted "EMPTY" and/or "DO NOT USE", respectively. In a preferred embodiment of the invention, rows of spaced-apart dividers are provided in each "GREEN" and "RED" section to keep the bottles placed there separated one from another, with individual ones of the dividers being horizontally offset with respect to one another so as to allow the staging mat to be folded over—with the interleaving of the dividers—and ready for storage in the fire truck awaiting future use. In this embodiment of the invention to be described, it will also be appreciated that the dividers may be fixedly secured within pocket enclosures on the mat, and extending above the surface, typically some ½ in., and of a length of some 18 in. In an alternative embodiment, it will be readily understood by those skilled in the art that the dividers may, where desired, simply be slid into position within these pockets when the mat is deployed, and then removed therefrom for storage when the mat is folded over for later use. In such manner, the pressurized air-bottle staging mat of the invention will be appreciated to ease the separation between, and segregation of, the "FILLED" and "EMPTIED" bottles at the fire scene.

BRIEF DESCRIPTION OF THE DRAWING

These and other features of the present invention will be more clearly understood from a consideration of the sole FIGURE of the drawing, illustrating a pressurized air-pak bottle staging mat incorporating a preferred embodiment of the invention.

DETAILED DESCRIPTION OF THE DRAWING

Figure 1:
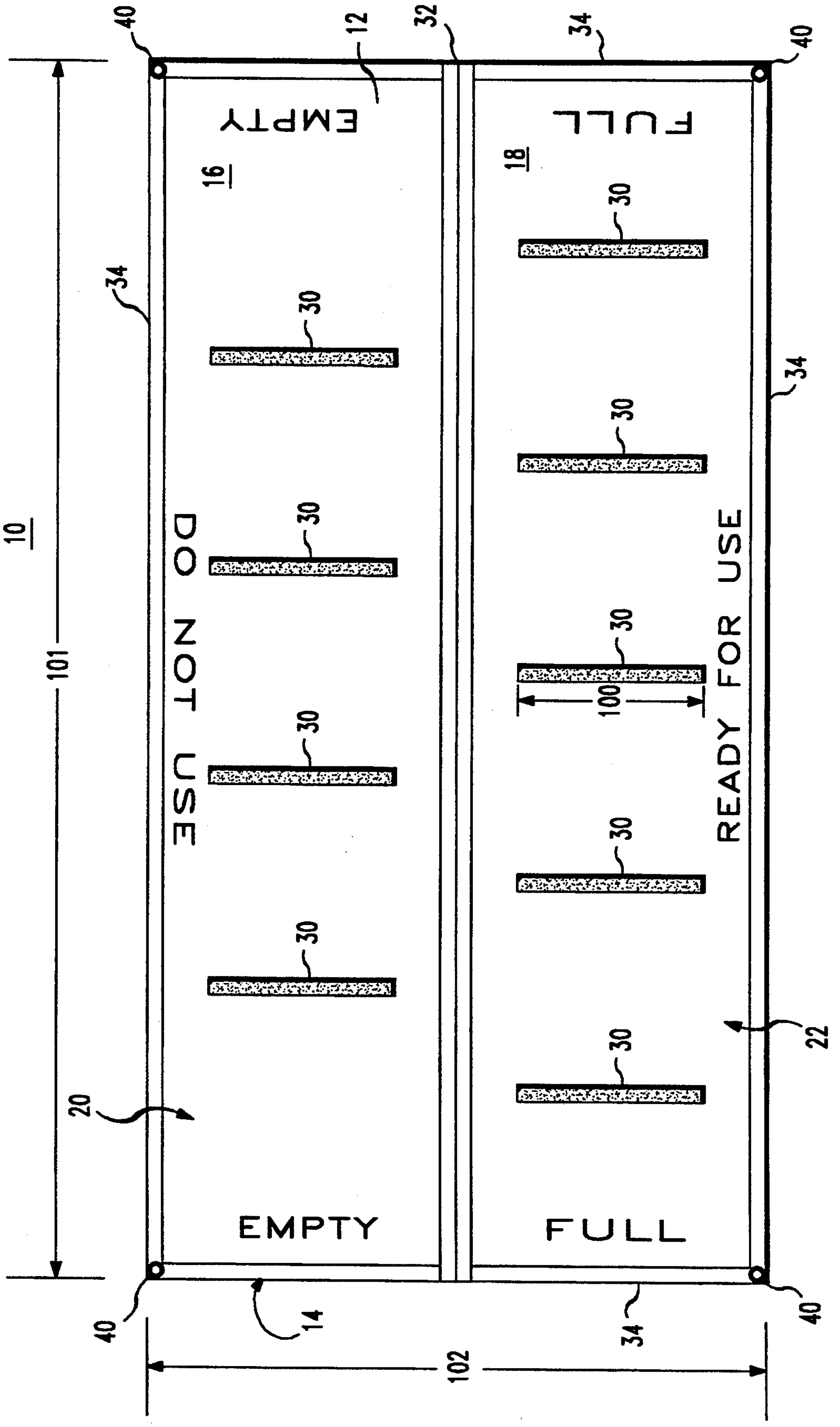

In FIG. 1 the staging mat of the invention (not to scale) is shown at 10 as having a front surface 12 and a back surface 14, and with the front surface 12 having upper and lower horizontally extending sections 16, 18, respectively. Such staging mat 10 is preferably composed of a water resistant, durable, foldable composition—as a tarpaulin, for example—and, in accordance with the invention, is color-coded, being composed of a "RED" coloration 20 as the upper section 16 and of a "GREEN" coloration 22 for the lower section 18. For ease of deployment, each section 16, 18 bear imprinting instructions—such as the notations "EMPTY" and "DO NOT USE" in the "RED" material section 16 and "FULL" and "READY FOR USE" in the "GREEN" section 18. Such imprinting may be of any appropriate material—such as 3 in. reflective letters, sewn onto the mat 10 of a SCOTCHLITE material readily obtainable from the 3M Company. In laying out the mat 10 for use, the upper section 16 is to be deployed facing the fire-truck while the lower section 18 is laid out facing the fire. As will be appreciated, this set up thus serves to arrange the air-pak bottles so that the "EMPTY" or "RED" material side of the mat 10 faces the engine where the air-pak bottles are to be refilled in fighting the fire.

Also shown in the drawing, in this illustrative embodiment, are two rows of a plurality of spaced-apart dividers 30, with the individual ones arranged in the upper section 16 being horizontally offset with respect to the individual ones in the lower section 18. Such alignment will be understood to allow the mat 10 to be folded along its center seam 32, and in a way that the eccentrically aligned dividers 30 interleave with the one another, in non-interfering placement. (In this respect, it will be understood that reference numeral 34 simply designates a finishing seam around the perimeter of the staging mat 10, illustratively depicted as being of orthogonal design, although any configuration might be utilized and still carry out the teachings of the invention)

In accordance with a preferred embodiment of the invention as constructed, the spaced-apart dividers 30 are simply fabricated from a length of vinyl hose of ½ in. diameter (but, obviously, other diameters and/or materials may be employed instead), and slid into pocket enclosures provided in the front surface 12 of the mat material 10, and selected, for example, of a length 100 of some 18 in. opening. When constructed in this manner, the dividers 30 extend above the front surface 12 a distance of this approximate ½ in., and serve to separate any air-pak bottles between adjacent dividers—and, between any "end" divider and the finish seam 34. In this preferred embodiment, the dividers 30 are fully inserted within the spaced-apart pocket enclosures in the front surface 12, and stitched permanently into place—while in an alternative embodiment, the dividers may simply be slid into an appropriate enclosure for placement, and later removal for storage when the mat is being folded and put away for later use. When deployed at the fire scene, the spaced-apart dividers 30—whether constructed of vinyl hose or otherwise—serve as "ribs" to segregate the bottles. As will be appreciated by those skilled in the art, these dimensions work perfectly well for separating and segregating the pressurized air-pak bottles which typically are some 18 in. long and 6 in. in diameter for half-hour bottles and 24 in. long and 8 in. in diameter for one-hour bottles.

In use of the invention, instances may arise where it becomes desirable to secure the staging mat 10 to the ground on which it lays, separate and apart from being held there by the weight of the air-pak bottles. Thus, and as particularly appropriate for windy conditions, this embodiment of the present invention incorporates a plurality of eyelets 40 at the front and back surfaces 12, 14, respectively, of the mat, along with any appropriate pins or bolts to pass through the eyelets 40 and secure the mat to the ground. Alternatively, any other type of arrangement may be employed, as desired, serving, for example, merely to couple to the back surface 14 of the mat in securing it directly to the ground.

In the preferred embodiment of the invention, any appropriate selection must keep in mind the durability of the material employed for the staging mat 10. In very heavy usage, where the mat is to be employed more frequently (as in City-use, on sidewalks and in gutters), 18 oz./sq. yd. weighted material has been found to prove quite attractive; in rural usage, on the other hand, in primarily fighting residential fires, a 10 oz./sq. yd. weighted material is seen as being sufficiently desirable and long lasting in expected use. With dimensions 101 and 102 of some 96 in. and 50 in. respectively for the orthogonal staging mat 10 of the invention, some 18–20 air-pak bottles can be stored, separated and segregated for use—without banging into one another to cause structural damage, all the while permitting the bottles to be easily identified as being "FULL" or "EMPTY" for firematic use.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. Apparatus for organizing pressurized air-pak bottles for emergency firematic use, comprising:

- a mat having a front surface, a back surface, an upper horizontally extending section in each of said front and back surfaces, and a lower horizontally extending section in each of said front and back surfaces;
- a first row of a plurality of spaced-apart dividers in said horizontally extending upper section of said front surface;
- a second row of a plurality of spaced-apart dividers in said horizontally extending lower section of said front surface;
- with individual dividers of said first row being horizontally offset with respect to individual dividers of said second row;
- with each of said individual dividers extending above said front surface of said mat a distance to separate air-pak bottles placed between adjacent dividers; and
- with said mat being of a water-resistant, foldable composition.

2. The apparatus of claim 1 wherein said front surface of said mat incorporates a plurality of pocket enclosures for receiving one each of said plurality of spaced-apart dividers of said first row and of said second row.

3. The apparatus of claim 2 wherein said pocket enclosures are of a substantially 18 in. length.

4. The apparatus of claim 3 wherein said spaced-apart dividers of said first row and said spaced-apart dividers of said second row are each in the nature of vinyl hose inserts of substantially ½ in. diameter.

5. The apparatus of claim 1 wherein said front surface of said mat incorporates a plurality of pocket enclosures for receiving one each of said plurality of spaced-apart dividers of said first row and of said second row for use and for removing said plurality of spaced-apart dividers of said first row and of said second row for later storage.

6. The apparatus of claim 1 wherein said upper horizontally extending section of said front surface and said lower horizontally extending section of said front surface are each colored-coded for use.

7. The apparatus of claim 6 wherein said upper horizontally extending section of said front surface is of a primarily red coloration.

8. The apparatus of claim 7 wherein said lower horizontally extending section of said front surface is of a primarily green coloration.

9. The apparatus of claim 6 wherein said upper horizontally extending section of said front surface and said lower horizontally extending section of said front surface are each imprinted with directions for use.

10. The apparatus of claim 1 wherein said mat comprises a tarpaulin of rubber or vinyl-coated cotton material.

11. The apparatus of claim 10 wherein said tarpaulin is of a weight of the order of 10–18 oz./square yard.

12. The apparatus of claim 1 also including means coupled to said back surface of said mat for securing said mat to the ground for use.

13. The apparatus of claim 1 also including a plurality of eyelets at the extremities of said front and back surfaces of said mat, and means extending through said eyelets for securing said mat to the ground for use.

14. The apparatus of claim 1 wherein said individual dividers extend approximately ½ in. above said front surface of said mat.

15. Apparatus for organizing pressurized air-pak bottles for emergency firematic use, comprising:

- a mat having a front surface, a back surface, an upper horizontally extending section in each of said front and back surfaces, and a lower horizontally extending section in each of said front and back surfaces;
- a first row of a plurality of spaced-apart dividers in said horizontally extending upper section of said front surface;
- a second row of a plurality of spaced-apart dividers in said horizontally extending lower section of said front surface;
- with individual dividers of said first row being horizontally offset with respect to individual dividers of said second row;
- with each of said individual dividers extending above said front surface of said mat a distance to separate air-pak bottles placed between adjacent dividers;
- with each of said individual dividers being in the nature of inserts of substantially ½ in. height; and
- with said mat being of a water-resistant, foldable composition.

* * * * *